(12) United States Patent
Buttridge

(10) Patent No.: US 11,103,804 B2
(45) Date of Patent: Aug. 31, 2021

(54) HEAT INTEGRATED SEPARATION SYSTEM WITH ACTIVE VAPOR CONTROL

(71) Applicant: GTI SOLUTIONS INTERNATIONAL LLC, Flower Mound, TX (US)

(72) Inventor: Ian Buttridge, Garland, TX (US)

(73) Assignee: GTI SOLUTIONS INTERNATIONAL LLC, Flower Mound, TX (US)

( * ) Notice: Subject to any disclaimer, the term of this patent is extended or adjusted under 35 U.S.C. 154(b) by 0 days.

(21) Appl. No.: 16/499,199

(22) PCT Filed: Mar. 28, 2018

(86) PCT No.: PCT/US2018/024799
§ 371 (c)(1),
(2) Date: Sep. 27, 2019

(87) PCT Pub. No.: WO2018/183468
PCT Pub. Date: Oct. 4, 2018

(65) Prior Publication Data
US 2020/0101397 A1    Apr. 2, 2020

Related U.S. Application Data

(60) Provisional application No. 62/477,992, filed on Mar. 28, 2017.

(51) Int. Cl.
*B01D 3/14* (2006.01)
*B01D 3/42* (2006.01)

(52) U.S. Cl.
CPC ............ *B01D 3/141* (2013.01); *B01D 3/143* (2013.01); *B01D 3/42* (2013.01)

(58) Field of Classification Search
CPC .... B01D 3/141; B01D 3/4222; B01D 3/4238; B01D 3/4244; B01D 3/4261;
(Continued)

(56) References Cited

U.S. PATENT DOCUMENTS 2,471,134 A * 5/1949 Wright ..................... B01D 3/14
 196/111
4,167,475 A * 9/1979 Winter, III ............... B01D 3/14
 196/132

(Continued)

*Primary Examiner* — Jonathan Luke Pilcher

(57) ABSTRACT

A separation system includes a column including a stripping section proximal to a lower end of the column, a rectifying section proximal to an upper end of the column, and an intermediate section disposed between the stripping section and the rectifying section. The intermediate section includes first and second vertical sides separated by a vertical wall. The column includes a feed port to receive a material stream to be separated. The separation system further includes a reboiler in fluid communication with the column. The reboiler provides vapor to the stripping section. The separation system also includes a condenser in fluid communication with the column. The condenser provides liquid to the rectifying section, the condenser to provide a distillate effluent stream. The separation system further includes an active vapor control to control the relative vapor flow rate to the first and second sections.

11 Claims, 9 Drawing Sheets

(58) Field of Classification Search
CPC .. B01D 3/4266; B01D 3/4272; B01D 3/4277; B01D 3/42–4294
See application file for complete search history.

(56) References Cited

U.S. PATENT DOCUMENTS

| | | | | |
|---|---|---|---|---|
| 4,230,533 | A * | 10/1980 | Giroux | B01D 3/4255 203/1 |
| 8,901,346 | B2 * | 12/2014 | Merenov | B01D 3/14 560/352 |
| 10,018,413 | B2 * | 7/2018 | Du | F25J 3/04096 |
| 2011/0172458 | A1 * | 7/2011 | Merenov | B01D 3/141 560/347 |
| 2011/0178328 | A1 * | 7/2011 | Merenov | C07C 263/20 560/330 |
| 2017/0030640 | A1 * | 2/2017 | Du | F25J 3/04303 |

* cited by examiner

HEAT INTEGRATED SEPARATION SYSTEM WITH ACTIVE VAPOR CONTROL

CROSS-REFERENCE TO RELATED APPLICATION(S)

This application is a 371 application of International Patent Application PCT/US18/24799, filed Mar. 28, 2018, which claims benefit of U.S. Provisional Application No. 62/477,992, filed Mar. 28, 2017, each of which is incorporated herein by reference in its entirety.

FIELD OF THE DISCLOSURE

This disclosure, in general, relates to separation systems incorporating heat integration and active vapor control.

BACKGROUND

In the chemical industry, it is often desirable to separate more than one product from a multicomponent material stream. While several separation technologies exist, distillation is often the most convenient and easy to implement separation technique. As such, the chemical industry often uses a series of separate distillation columns to separate multiple components one-by-one from a multi-component material stream.

For example, as illustrated in FIG. 1, a conventional distillation system 100 includes two columns 102 and 104 used to separate a three component system designated A, B, and C. The multicomponent stream ABC is fed into the first column 102 which includes a reboiler 106 to generate vapor to feed into the column and includes a condenser 110 to receive vapor from the column and to feed liquid back to the column 102 and provide separated first product stream A. A control valve 112 controls the liquid reflux rate back to the column or alternatively controls flow of the product effluent stream A. Similarly, a control valve 108 can control the amount of heat supplied to the reboiler 106, which in turn controls the amount of vapor provided back to the column 102. A liquid product from the column 102 includes multiple components, such as B and C, which are fed to the second column 104. The second column 104 includes a reboiler 114 and a condenser 118. A control valve 116 can manipulate the heat supplied to the reboiler 114 to in turn manipulate a vapor flow rate into the column 104. A control valve 120 can control liquid reflux back to the column from the condenser 118. Each of these control systems thus manipulates the composition and flow rate of the respective streams B and C.

Despite the convenience of such a system, conventional distillation systems, such as those illustrated in FIG. 1, provide poor heat integration and thus, consume considerable energy to facilitate separations. In addition, setting up separate distillation columns, each with their own associated reboilers, condensers, control circuitry, and column internals, provides for an expensive system with a large footprint. As such, conventional distillation systems tend to be both expensive to build and expensive to operate.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a separation system includes one or more columns, a reboiler, and a condenser. At least one column includes a stripping section proximal to a lower end of the column and at least one column includes a rectifying section proximal to an upper end of the column. The reboiler receives liquid from a lower end of the column and provides vapor to the lower end of the stripping section, and the condenser receives vapor from an upper end of the rectifying section and provides liquid to the upper end of the rectifying section. The system further includes one or more intermediate sections in fluid communication between an upper end of the stripping section and a lower end of the rectifying section. In an example, the intermediate section is a divided wall section defining two vertical sides within a single column separated by a divider. In another example, an intermediate section is formed by a separate column attached fluidically between the stripping section and the rectifying section along with an intermediate section within the column below the rectifying section above the stripping section. The system can further include an active vapor control system, controlling the relative vapor flow through the first and second vertical sides or the first and second intermediate sections. For example, the active vapor control can include a vapor bypass having an in-line control valve and a vapor restriction provided at a lower end of one of the vertical sides. Further, the separation system can include a liquid distribution system collecting liquid from the lower end of the rectifying section and distributing liquid to the first and second vertical sides or first and second intermediate sections.

In a further embodiment, a two-column system can be converted to a divided wall system by placing a divided wall intermediate section at an upper end of a first distillation column, a lower end of a second distillation column, or a combination thereof. Vapor flow through a second vertical side of the two vertical sides of the divided wall section can be controlled using a vapor bypass with a control valve. In such a configuration, a condenser associated with the first column and a reboiler associated with the second column can be removed. A multicomponent feed stream can be provided to first vertical section of the divided wall section.

Figure 1:
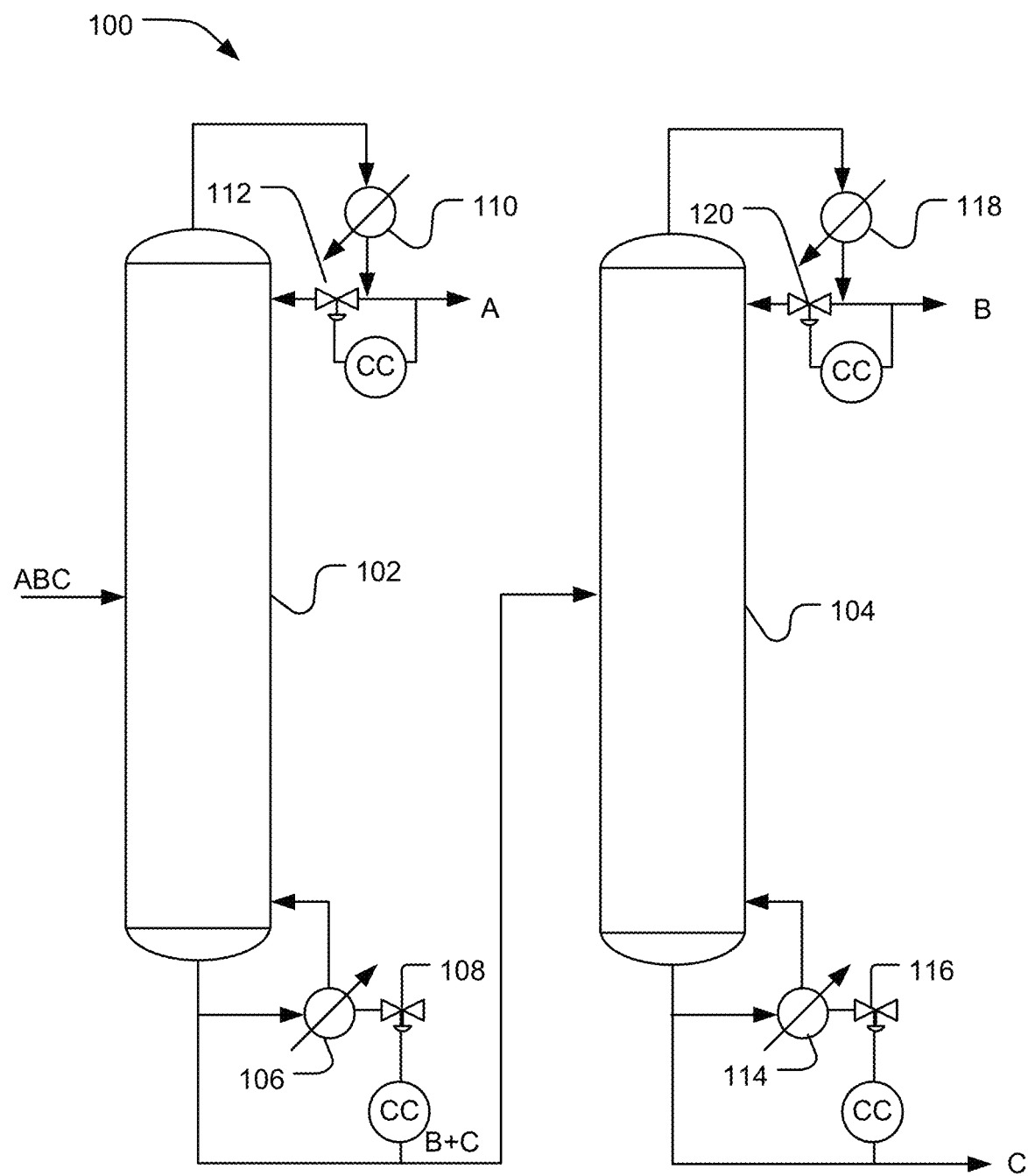
FIG. 1 includes an illustration of a conventional two-column distillation system.
Figure 2:
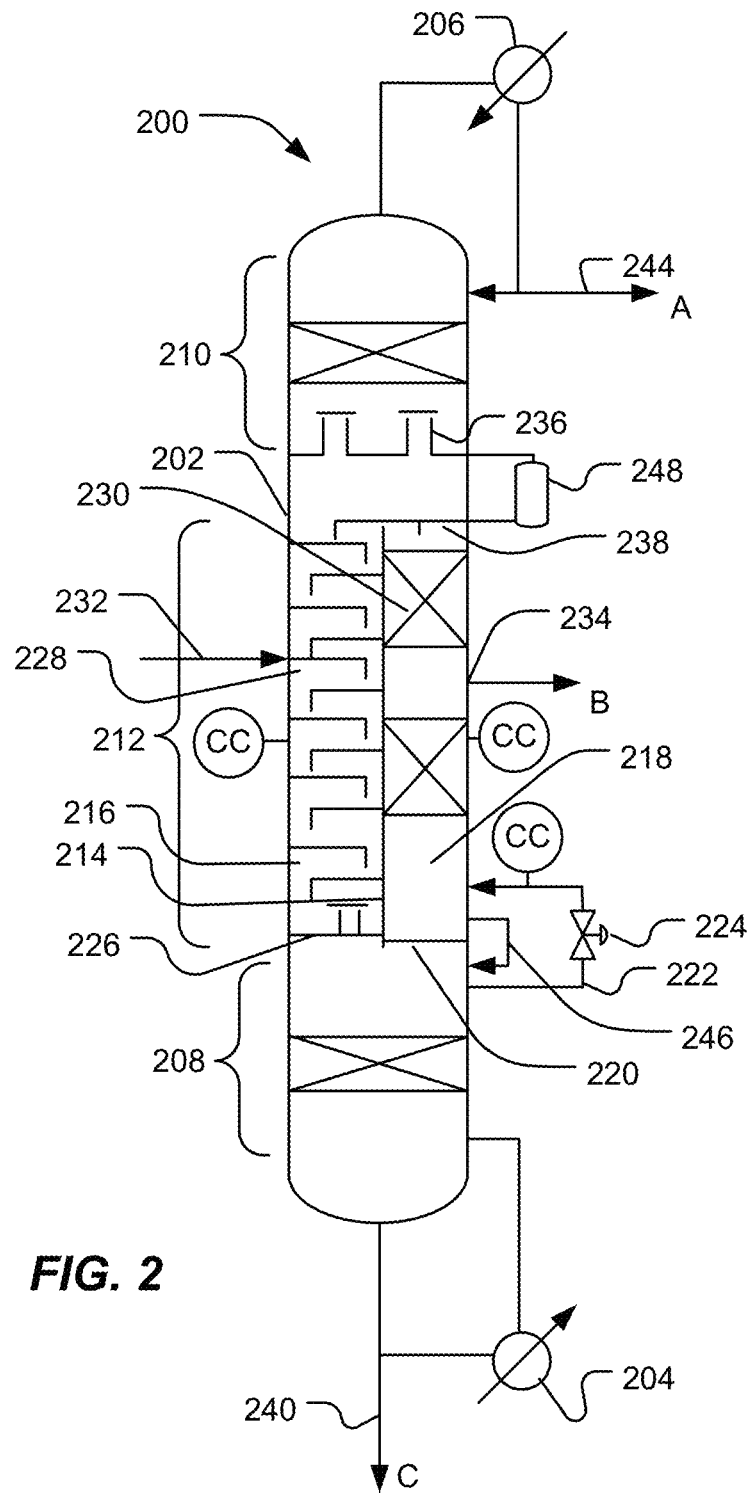
FIG. 2 includes an illustration of an example divided wall column distillation system.

An example separation system 200 is illustrated in FIG. 2. The system 200 includes a column 202, a reboiler 204, and a condenser 206. Internal to the column 202, a stripping section 208 and a rectifying section 210 can be defined. The stripping section 208 resides at a lower end of the column 202, and the rectifying section 210 resides at an upper end of the column 202. Liquid leaving the lower end of the stripping section 208 can be sent to the reboiler 204 and provide vapor to the column 202. Vapor from the rectifying section 210 at an upper end of the column 202 can be provided to the condenser 206, which provides a liquid reflux stream back to the upper end of the rectifying section 210 and an effluent stream 244. The stripping section 208 can include vapor-liquid contact elements, such as tray-type vapor-liquid contact elements, packing-type vapor-liquid contact elements, or a combination thereof. The rectifying section 210 can include vapor-liquid contact elements, such as tray-type vapor-liquid contact elements, packing-type vapor-liquid contact elements, or a combination thereof.

Internal to the column 202 and disposed between the stripping section 208 and the rectifying section 210, an intermediate section 212 is defined. As illustrated, the intermediate section 212 can be a divided wall section defining a first vertical side 216 and a second vertical side 218 separated by a divider 214. As such, vapor or liquid flowing through the first vertical side 216 do not mix or interact with vapor or liquid flowing through the second vertical side 218 until it flows beyond the ends of the intermediate section 212.

The relative vapor flow rate through the first vertical side 216 and the second vertical side 218 can be controlled using an active vapor control system. In the illustrated example, a vapor restriction 220 is placed at a lower end of the second vertical side 218, separating it from the stripping section 208. The vapor restriction 220 limits or prevents vapor flow into the second vertical side 218. Alternatively, the vapor restriction 220 can be placed at an intermediate location or at an upper end of the second vertical side 218. A vapor bypass 222 can be used to provide vapor from an upper end of the stripping section 208 to the second vertical side 218, bypassing the restriction 220. A control valve 224 in line with the bypass line 222 can control the flow of vapor flowing from an upper end of the stripping section 208 to the lower end of the second vertical side 218. Optionally, the system can include a liquid bypass 246 extending around the restriction element 220. In an example, the liquid bypass 246 can include elements to prevent the flow of vapor.

Optionally, to compensate for pressure drop in the second vertical side, a pressure drop element 226 can be provided in the first vertical side 216, such as at a lower end of the first vertical side 216, to assist with maintaining equal pressure drop across the two vertical sides 216 or 218. To allow for pressure drop to be taken across the control valve 224, the first vertical side 216 and the second vertical side 218 can include different vapor-liquid contact elements. A lower pressure drop vapor-liquid contact elements 230 on the side 218 allows for the remainder of the pressure drop to be across the control valve 224. As illustrated, the pressure drop element 226 can be a chimney-type tray providing for a restriction in vapor flow. While the pressure drop element 226 is illustrated as being disposed at a lower end of a vertical side, the pressure drop element can alternatively be disposed at intermediate location or at an upper end of the vertical side. Further, while the restriction 220 and bypass 222 are illustrated as being disposed on the second vertical side 218 and the pressure drop element 226 is illustrated as being disposed at the lower end of the first vertical side 216, the restriction 220 and vapor bypass 222 can alternatively be disposed on the first vertical side 216, and the pressure drop element 226 can be disposed on the second vertical side 218.

In another example, a liquid collector 236 and liquid distributor 238 can be disposed at a lower end of the rectifying section 210 to collect liquid and redistribute the liquid to the first and second vertical sides 216 or 218. As illustrated, the liquid distribution system can include an external drum 248. Alternatively, the liquid distribution can be provided internal to the column.

Each of the vertical sides 216 or 218 includes vapor-liquid contact elements, such as packing or tray type vapor-liquid contact elements. In an example, the first vertical side 216 and the second vertical side 218 include similar vapor-liquid contact elements. Alternatively, the first vertical side 216 and the second vertical side 218 include different vapor-liquid contact elements. For example, as illustrated in FIG. 2, the first vertical side 216 can include tray-type vapor-liquid contact elements, and the second vertical side 218 can include packing-type vapor-liquid contact elements. Alternatively, the first vertical side 216 can include packing-type vapor-liquid contact elements, and the second vertical side 216 can include tray-type vapor-liquid contact elements. In another alternative, the first and second vertical sides can have different packing-type vapor-liquid contact elements or can have different tray-type vapor-liquid contact elements.

As illustrated in FIG. 2, a multicomponent feed port 232 provides access to the first vertical side 216. A product effluent 234 including an intermediate boiling product extends from the second vertical section 218. Alternatively, the feed can be provided to the second vertical side 218 and the intermediate boiling product effluent 234 can be drawn from the first vertical side 216. Generally, the feed is provided to an opposite side as that from which the effluent is drawn.

Control of the amount of vapor flowing through the vapor bypass 222 is performed using the control valve 224 based on a direct measurement of the mass flow rate of the vapor or based on implied measurements utilizing composition or temperature. For example, a mass flow meter can be incorporated into the vapor bypass line 222 and used to provide input to a control system manipulating the control valve 224. Alternatively, a composition can be measured proximal to the intermediate product effluent line 234 either above or below the effluent line from within the column or as the product exits the column. In a further example, temperature can be utilized to infer composition and used as a process variable input to a control system to control vapor flow rate. For example, temperature measurement can be made proximal to the effluent line, such as below line 234. In another example, a temperature difference across vapor-liquid contact elements within the second vertical side 218 can be utilized as input to a control system. In an alternative example, a difference across the column between approximately horizontally equal locations in the first and second vertical sides 216 or 218 can be utilized to infer a difference in composition, which can be used as part of an input for control of the control valve 224.

Such a system provides technical advantages not found in conventional distillation systems, including improved energy efficiencies, heat integration, and less equipment occupying a smaller pad footprint. Such efficiencies can translate into lower energy usage, lower equipment costs and material usage, and more compact allocation of pad sites within the plant. In a further example, such a system can be used to provide improved control of composition during disturbances in flow rates and multicomponent stream composition.

Figure 3:
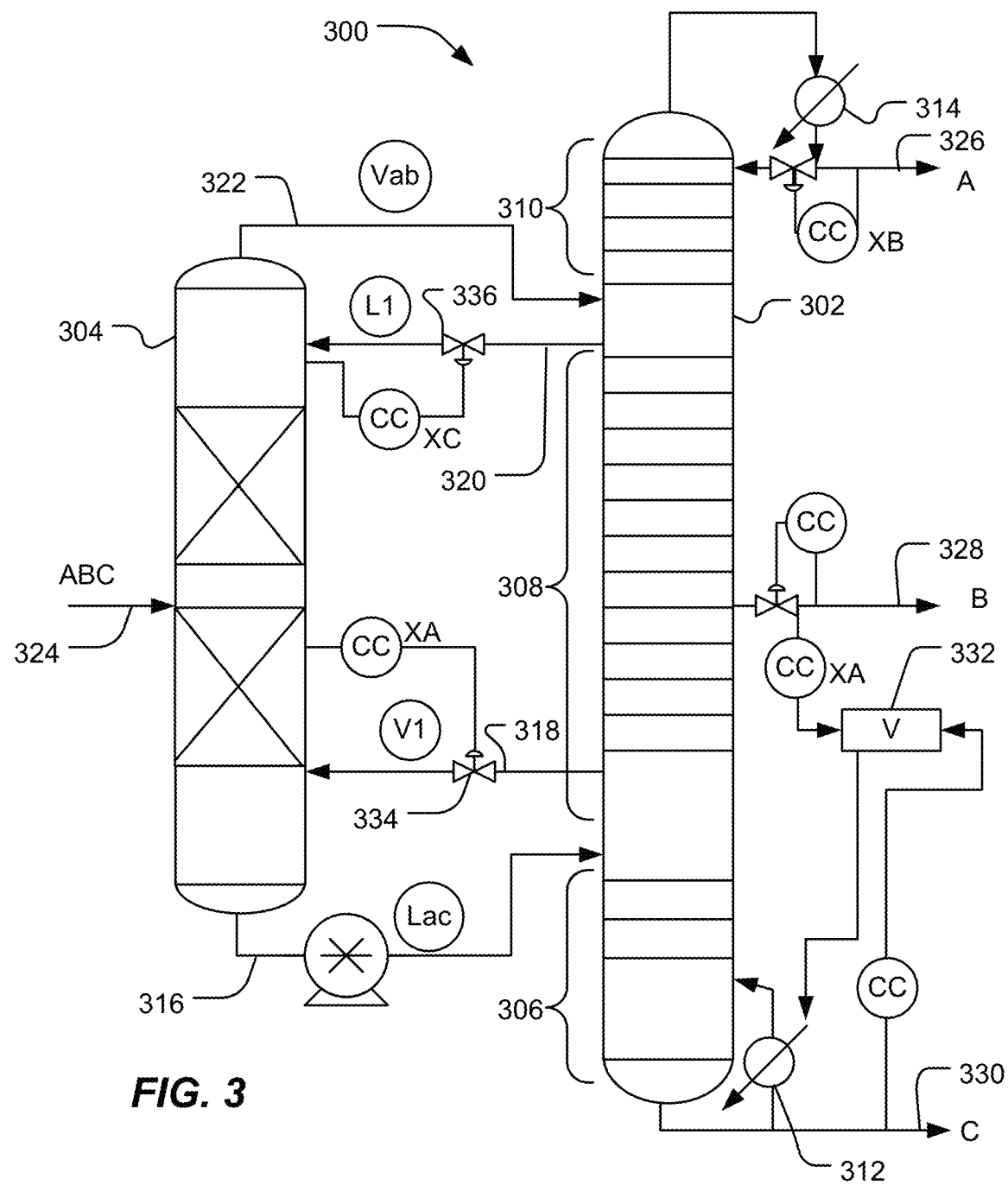
FIG. 3 includes an illustration of an example thermally coupled two-column distillation system.

In a further example of a heat integrated separation system illustrated in FIG. 3, the separation system 300 includes two columns: a column 302 and a column 304. In the illustrated example, the column 302 defines a stripping section 306, disposed at a lower end of the column 302, a rectifying section 310 disposed at an upper end of the column 302, and intermediate section 308 disposed between the stripping section 306 and the rectifying section 310. The column 304 defines a second intermediate section albeit in a separate column fluidically attached to the column 302 between the stripping section 306 and the rectifying section 310. For example, the column 304 can receive vapor from a vapor line 318 extending from an upper end of the stripping section 306 and the lower end of the intermediate section 308. The column 304 can also provide liquid to the upper end of the stripping section 306 using a liquid line 316. Further, the column 304 provides vapor through vapor line 322 to a lower end of the rectifying section 310 and receives liquid from the lower end of the rectifying section 310 through a liquid line 320.

A reboiler 312 is attached to the column 302 providing vapor to the stripping section 306 and receiving liquid from the stripping section 306. A condenser 314 receives vapor from the rectifying section 310 and provides liquid reflux to an upper end of the rectifying section 310.

As illustrated, a multicomponent feed 324 is provided to the second column 304 and an intermediate effluent stream 328 extends from the first column 302. Alternatively, the multicomponent feed 324 is provided to the first column 302 and the intermediate effluent stream 328 extends from the second column 304. A low boiling component stream 326 receives liquid from the condenser 314, and a high boiling point stream 330 receives liquid from the lower end of the column 302 or the reboiler 312. An intermediate boiling product stream 328 can be drawn from the intermediate section 308 of the column 302. A control system 332 can determine, based on measurements of composition or temperature associated with the effluent stream 330 or of the effluent stream 328, an amount of vapor to provide the column or an amount of heat to be provided to the reboiler 312.

In addition, the system can include active vapor control to control a relative vapor flow rate between the intermediate section 308 of column 302 and the intermediate section defined by column 304. Such control can be implemented using a control valve 334 in line with the vapor line 318. Process variable input to the control system can include a directly measured flow rate associated with vapor flowing from the column 302 to the column 304. Alternatively, the flow rate through the valve 334 can be controlled based on process variables associated with composition of components within column 304. Optionally, composition can be inferred from temperature, and temperature can be used as the process variable input. In another example, the liquid flow rate from the column 302 can be controlled using valve 336 in liquid line 320. The control of such a valve can utilize composition or mass flow rate as process variables. In a particular example, the control valve 336 is manipulated based on implied composition within the column utilizing temperatures proximal to an upper end of the column 304. In a further example, a temperature difference across a portion of the column 304 can be utilized as a process variable input provided to either the control algorithm controlling the vapor control valve 334 or controlling the liquid control valve 336. In a further example, a composition, temperature, or temperature difference within the section 308 can be used as a process variable input to control the valve 334. The mass transfer equipment of the columns 304 and 302 can be designed such that each side has a largely different pressure drop profile, allowing for pressure drop and flow control via vapor control valve 334.

In a further embodiment, a conventional two-column distillation system can be converted to a heat integrated divided wall distillation system. When implementing the integrated divided wall system into conventional two-column distillation system, a divided wall section can be inserted into an upper portion of a first column, a lower portion of a second column, or a combination thereof. A condenser can be disconnected from the first column, and a reboiler can be disconnected from the second column, providing heat integration and improved energy efficiency.

Figure 4:
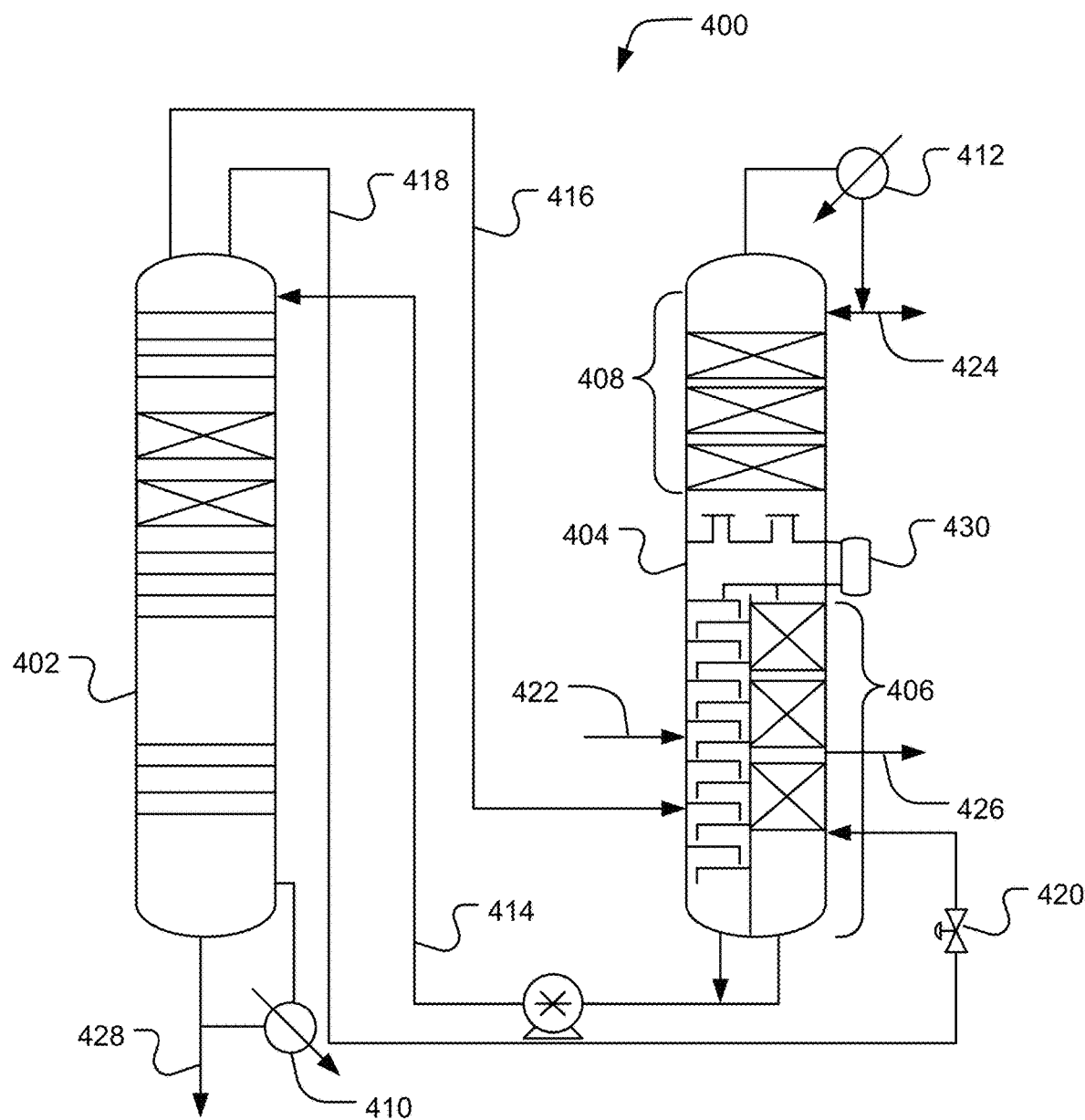
FIG. 4, FIG. 5, and FIG. 6 include illustrations of example retrofit two-column distillation systems.

For example, as illustrated in FIG. 4, a separation system 400 can include a first column 402 and a second column 404. A divided wall section 406 can be inserted into the second column 404 proximal to the lower end of the second column 404. In such an example, the upper end of the second column 404 can form a rectifying section 408, and the first column 402 can behave as a stripping column.

For example, the first column 402 can include a reboiler 410 and can provide an effluent stream 428 of heavier boiling components. A liquid line 414 extending from the lower end of the second column 404 can provide liquid to an upper end of the first column 402. Vapor from an upper end of the column 402 can be divided into two lines 418 and 416 each providing vapor to separate sides of the divided wall section 406. At least one of the vapor lines (e.g., vapor line 418) can include a controller 420 to control the relative vapor flow into the divided wall sections.

The second column 404 can include a condenser 412 that receives vapor from an upper end of the rectifying section 408 and provides liquid reflux to the rectifying section 408 or provides an effluent stream 424. As illustrated, a multi-component feed stream 422 is provided to one side of the divided wall section 406 and a stream 426 including an intermediate boiling product can draw from the opposite side of the divided wall section 406. Further, the system can include a collection tray and liquid distribution system 430.

Figure 5:
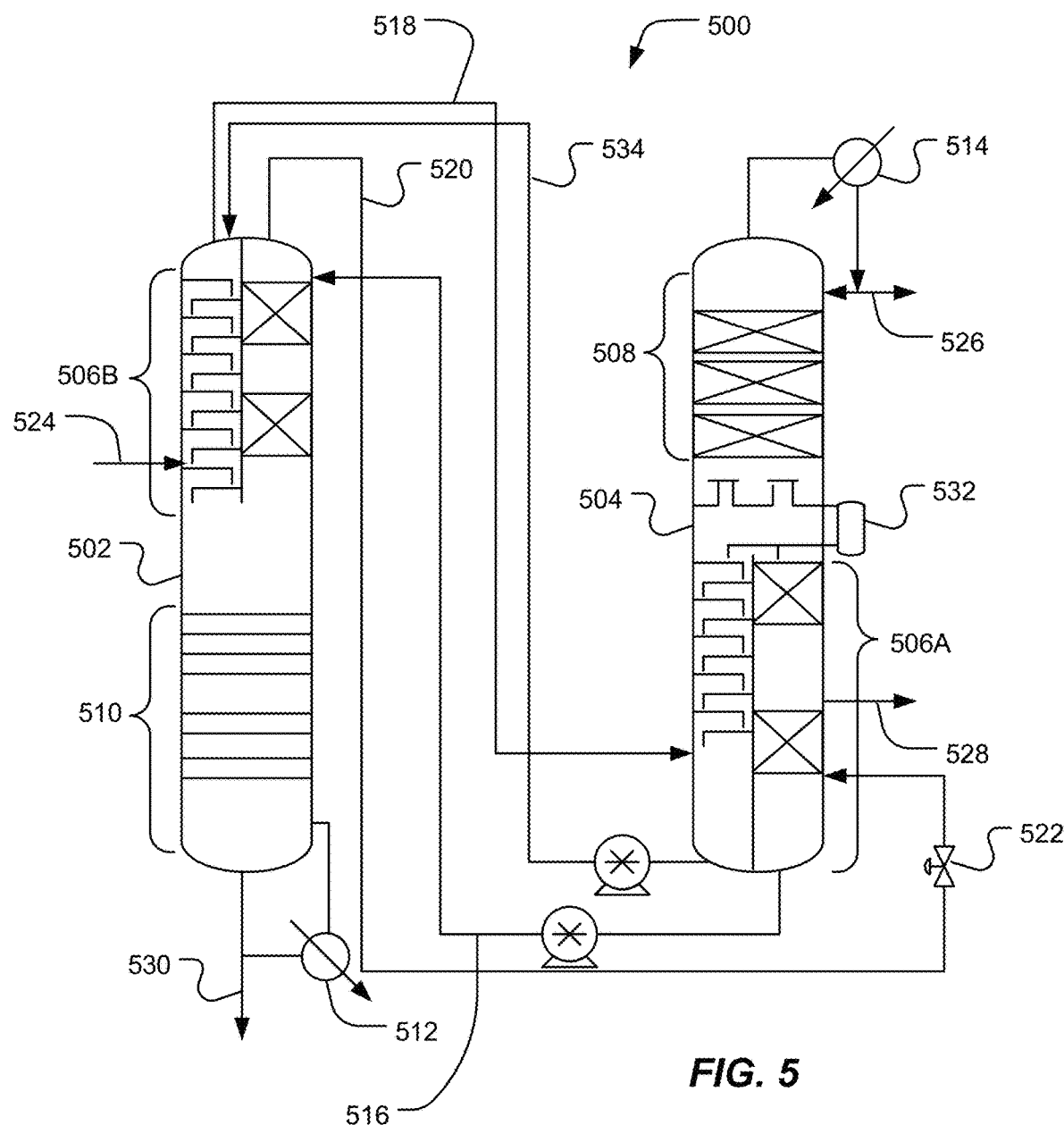

FIG. 5 illustrates an alternative separation system 500 in which the divided wall section (506a and 506b) is provided partially in the first column 502 and partially in the second column 504. The first column 502 can include a reboiler 512 that provides vapor to the lower end of the first column 502 to a section 510 that behaves as a stripping section. A high boiling component effluent stream 530 can extend from the lower end of the stripping section 510.

A lower end of the second column 504 can include a portion 506a of the divided wall section and an upper end of the first column 502 can include a portion 506b of the divided wall section. The second column 504 can include a rectifying section 508 disposed above the divided wall portion 506a. Further, the second column 504 includes a condenser 514 that receives vapor from the upper end of the rectifying section 508 and provides liquid reflux to the upper end of the rectifying section 508 and a low boiling component effluent stream 526. Optionally, a liquid collector and liquid distribution system 532 can be provided between the rectifying section 508 and the portion 506a of the divided wall section.

To maintain the separation of the liquid and vapor streams extending within the divided wall section, two liquid lines 516 and 534 draw liquid from separated sides of the portion 506a of the divided wall section and provide the liquid to corresponding sides of the divided wall portion 506b. Similarly, two vapor streams (518, 520) extend from the upper end of the divided wall portion 506b, maintaining a separate vapor stream for each side of the divided wall section, and provide the vapor to a lower end of the portion 506a of the divided wall section. To facilitate active vapor control, one or more valves, such as control valve 522, can be provided on at least one of the vapor streams (e.g., vapor stream 520).

The multi-component stream 524 can be provided either to a side of the portion 506*b* or a side of the portion 506*a*, and an intermediate boiling component stream 528 can be drawn from the opposite side of either the portion 506*b* or the portion 506*a*. Alternatively, the intermediate boiling component stream 528 can be drawn from the liquid line 516. In another example, the multi-component stream 524 can be provided either to a first side of the portion 506*b* or the first side of the portion 506*a*, and the intermediate boiling component stream 528 can be drawn from a second side of the other of the portion 506*b* or the portion 506*a*.

Figure 6:
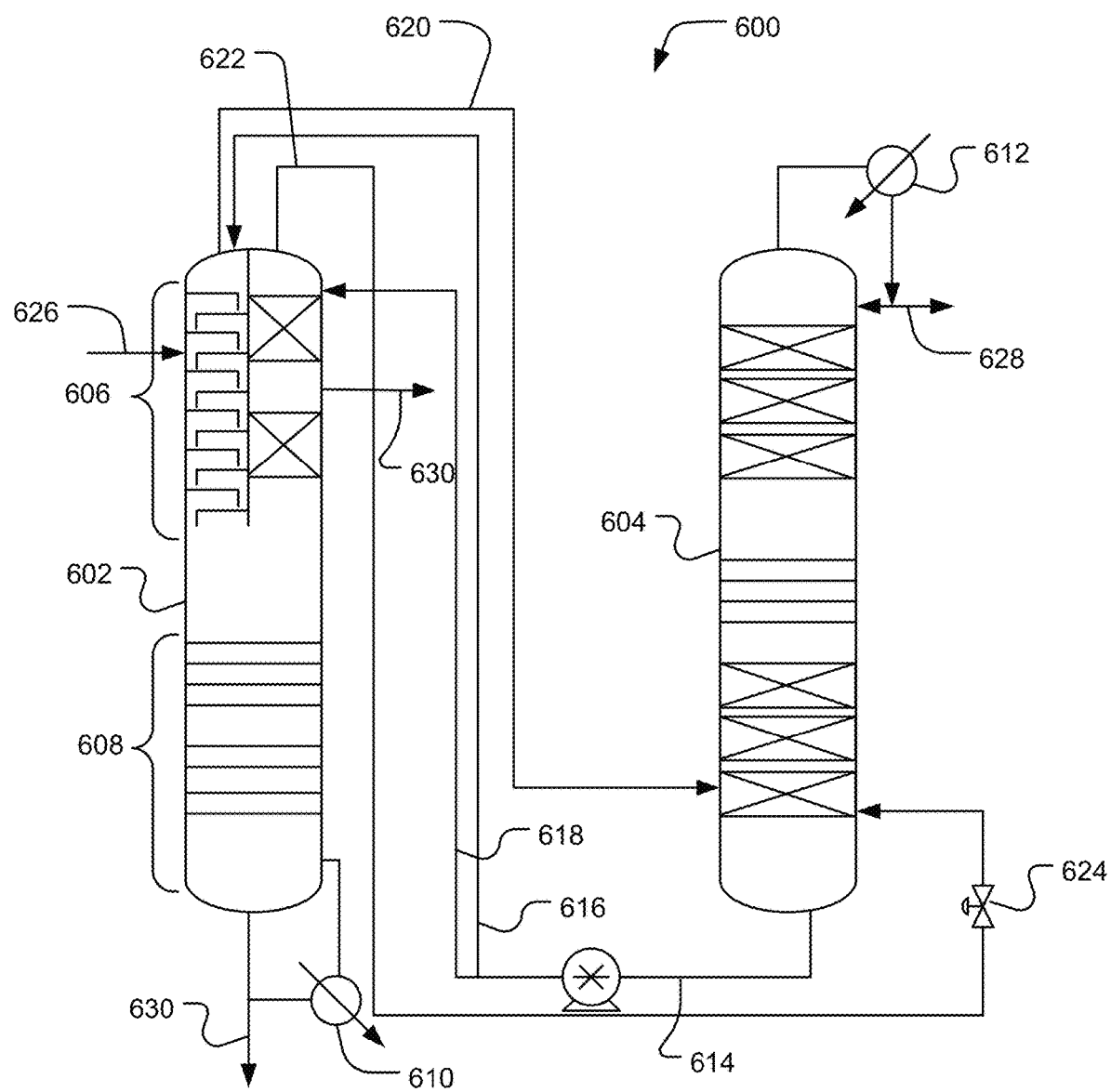

A further embodiment of a retrofit system is illustrated in FIG. 6. A system 600 includes two columns 602 and 604. The divided wall section 606 is disposed at an upper end of the first column 602, which defines a stripping section 608 at a lower end of the column 602. The column 604 acts as a rectifying section. The column 602 includes a reboiler 610 and provides a high boiling point component stream 630 from a lower end of the stripping section 608.

The column 604 includes a condenser 612 that receives vapor from an upper end of the column 604 and provides a reflux liquid to the column 604 and a bow boiling component stream 628. Liquid from the lower end of the column 604 can be drawn through a line 614 and divided into two liquid streams 616 and 618 provided to opposite sides of the divided wall section 606. Alternatively, a distributor can be formed at the upper end of the column 602 above the divided wall section 606 to distribute the liquid to the two sides of the divided wall section 606. As illustrated, two vapor streams 620 and 622 can be drawn from the sides of the upper end of the divided wall section 606 and fed to a lower end of the column 604. One of the vapor streams (e.g., the vapor stream 622) can include a control valve 624 to control the vapor flow from a side of the divided wall section 606, thus controlling the vapor flow through that side of the divided wall section 606. The multicomponent stream 626 can be provided to a first side of the divided wall section 606, and an intermediate boiling component stream 630 can be drawn from the opposite side of the divided wall section 606.

Figure 7:
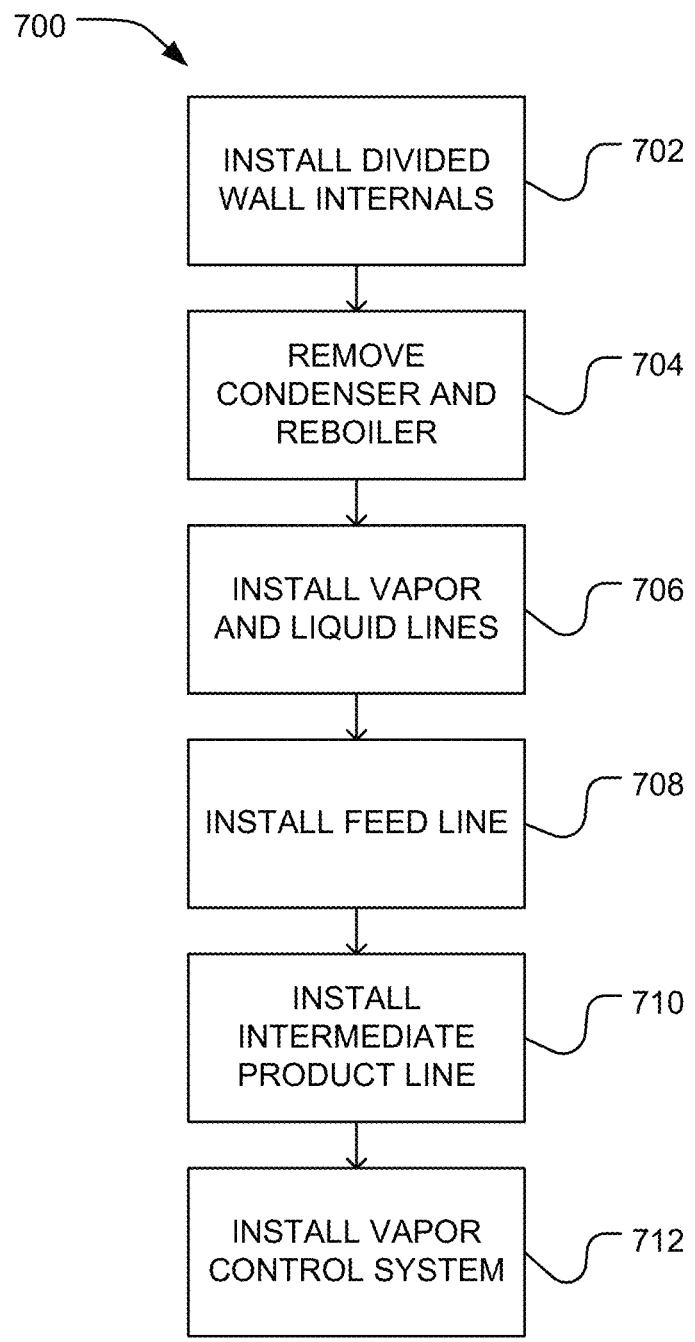
FIG. 7 includes a flow diagram illustrating an example method.

In an example method to convert a conventional two column distillation system to a heat integrated separation system, column internals can be replaced and associated vapor and liquid lines installed. For example, in the method 700 illustrated in FIG. 7, divided wall internals can be installed in one or more columns of the two-column distillation system, as illustrated at 702. A divided wall section can be inserted at a lower end of a second column or at an upper end of the first column, as illustrated in FIG. 4 or FIG. 6. Alternatively, as illustrated in FIG. 5, portions of a divided wall section can be installed at the upper end of the first column and at the lower end of the second column.

As illustrated at 704, the condenser can be removed from the first column and a reboiler can be removed from the second column. Vapor and liquid lines can be installed, along with an active vapor control system, based on the configuration of the divided wall section, as illustrated at 706.

Based on the design of the divided wall section, a feed line can be installed to feed a multicomponent stream to a side of the divided wall section, as illustrated at 708, and an intermediate product line can be installed to draw product from another side of the divided wall section, as illustrated at 710.

As illustrated at 712, a vapor control system can be installed to one or more of the vapor lines extending between the columns.

In such a manner, a conventional two-column distillation system can be converted to a heat integrated separation system, such as divided wall column with improved energy efficiency and control of product purities during upset conditions.

Figure 9:
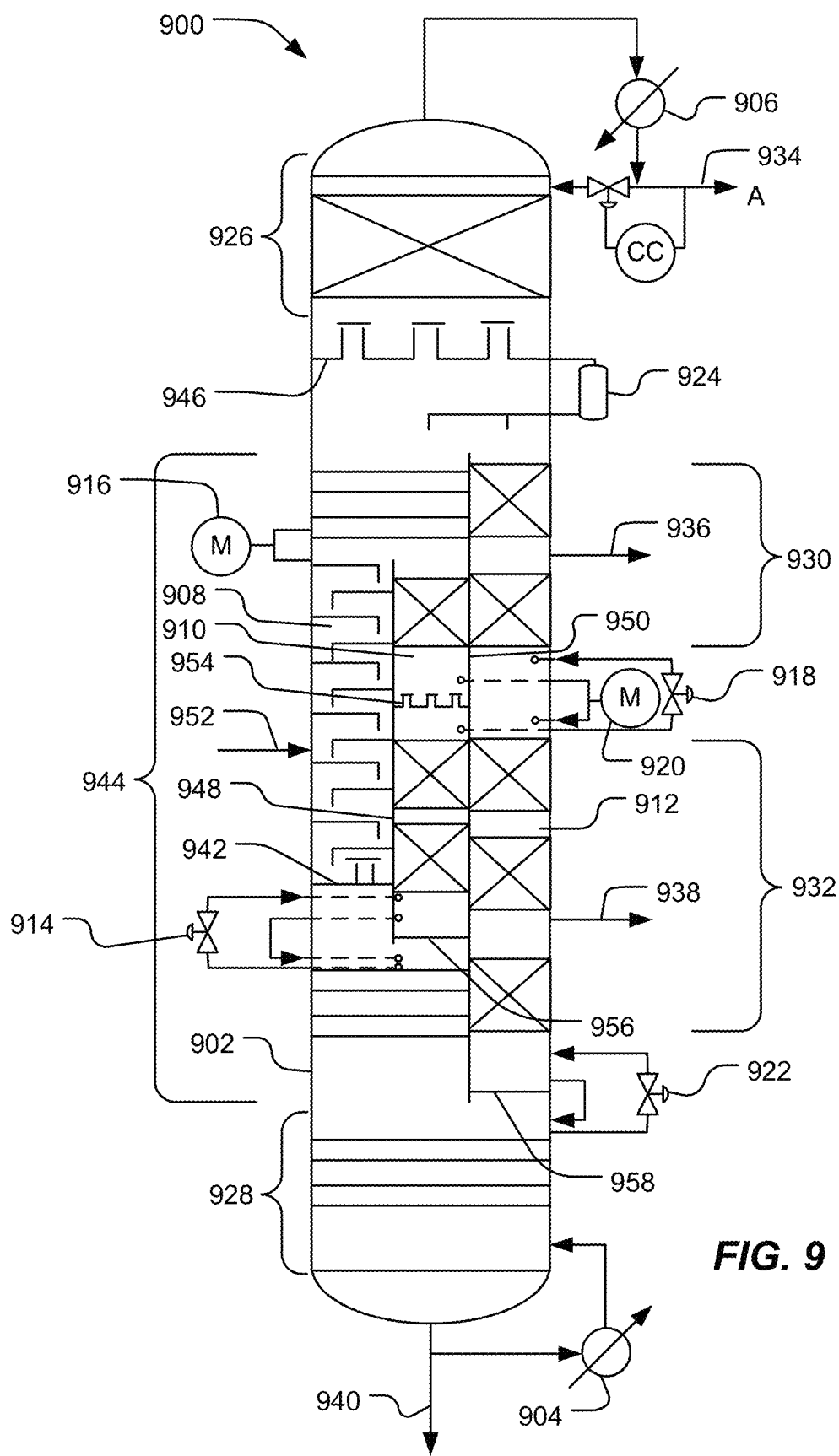
FIG. 9 includes an illustration of an exemplary divided wall column distillation system.

In a further exemplary embodiment, a divided wall column can be used to separate a product stream including four components (A, B, C, and D). Such a column can replace a three-column system. In an example illustrated in FIG. 9, a distillation system 900 includes a column 902, a reboiler 904, and a condenser 906. A lower section 928 of the column is fluidically connected to the reboiler 904 to provide liquid to the reboiler 904 and receive vapor from the reboiler 904. A product effluent stream 940 (component D) can draw from the liquid stream exiting the lower section 928.

The condenser 906 is fluidically connected to an upper section 926 of the column 902. The condenser 906 receives vapor from the upper section 926 of the column 902 and provides a liquid reflux to the upper section 926. A liquid effluent stream 934 (component A) can be drawn from the liquid stream exiting the condenser 906.

The column 902 can also include an intermediate section 944 that includes vertical dividing walls 948 and 950, dividing the intermediate vertical sides 908, 910 and 912. The dividing walls 948 and 950 isolate the sides 908, 910, and 912 from each other so liquid and vapor from the sides are only in communication at the upper end and lower end of the dividing walls 948 or 950. A multicomponent stream 952 (components A, B, C, and D) can be fed to the column at section 908.

In the illustrated example, the dividing wall 950 is longer than the dividing wall 948, providing for additional separation and allowing multiple effluent streams to be drawn from the intermediate section 944 of the column. For example, a lower boiling intermediate component B can be drawn from effluent stream 936 disposed closer to an upper end of the side 912, and higher boiling intermediate component C can be drawn from an effluent stream 938 disposed closer to a lower end of the side 912.

As illustrated, the column 902 can include a tray 946 to capture liquid flowing from the upper section 926 and meter the liquid into the side 912 of the intermediate section 944 using the liquid meter 924. Similarly, a liquid meter 916 can be utilized to meter liquid between sides 908 and 910. While illustrated as being connected to the side 908, the meter 916 can alternatively be used meter liquid to the side 910.

Vapor flowing into the sides 908, 910, and 912 can be controlled by placing vapor restrictors, such as 956 or 958, and providing a vapor bypass to control the vapor within the sections. For example, vapor flowing through the side 912 can be controlled using a vapor bypassed control 922 around a vapor flow restrictor 958. Similarly, vapor flowing through the side 910 can be controlled utilizing a vapor control 914 bypassing vapor flow restrictor 956. Further, the remaining side 908 can include a pressure drop element 942 to ensure equivalent pressure drop across each of the sides 908, 910, and 912. While the vapor restrictors and pressure drop elements are illustrated as being located near a lower end of the sides, the vapor restrictors can be positioned at different vertical locations within the sides. Further, the pressure drop element 942 can be replaced with an active vapor control, such as vapor restrictor and a vapor bypass control. Further, the arrangement of sides with a pressure drop element versus a vapor restrictor and bypass can be changed. For example, the pressure drop element can be associated with the side 910 and a vapor restrictor and bypass associated with the side 908.

Control of the amount of vapor flowing through a vapor bypass (e.g., vapor bypasses 914 or 922) or control of the amount of liquid flowing through distributors (e.g., distributors 916 or 924) is performed based on a direct measurement of the mass flow rate of the vapor or based on implied performance measurements utilizing composition or temperature. For example, a mass flow meter can be incorporated into the vapor bypass lines and used to provide input to a control system manipulating the control valves. Alternatively, a composition can be measured proximal to the product effluent lines either above or below the effluent line from within the column or as the product exits the column. In a further example, temperature can be utilized to infer composition and used as a process variable input to a control system to control vapor flow rate. For example, temperature measurement can be made proximal to the effluent line. In another example, a temperature difference across vapor-liquid contact elements within the vertical sides can be utilized as input to a control system. In an alternative example, a difference across the column between approximately horizontally equal locations in the vertical sides can be utilized to infer a difference in composition, which can be used as part of an input for control of the control valve.

In a further example, an additional tray 954 can be disposed at a vertical location within the side 910 to draw vapor and liquid. The vapor can be metered using a bypass control 918. The liquid can be metered using a bypass control 920. In an example, the vapor or liquid drawn from vertical side 910 or a portion thereof can be feed to vertical side 912. Control of the amount of vapor or liquid drawn from the vertical side 910 or feed to the vertical side 912 can be based on temperature, composition, or other measured flow rates.

The stripping section 928 can include vapor-liquid contact elements, such as tray-type vapor-liquid contact elements, packing-type vapor-liquid contact elements, or a combination thereof. The rectifying section 926 can include vapor-liquid contact elements, such as tray-type vapor-liquid contact elements, packing-type vapor-liquid contact elements, or a combination thereof. Each of the vertical sides, 908, 910, or 912 can have tray-type vapor-liquid contact element, packing-type vapor-liquid contact elements, or a combination thereof. For example, the first vertical side 908 can include tray-type vapor-liquid contact elements, the second vertical side 910 can include packing-type vapor-liquid contact elements, and the third vertical side 912 can include packing-type vapor-liquid contact elements. Alternatively, the first vertical side 908 can include packing-type vapor-liquid contact elements, the second vertical side 910 can include tray-type vapor-liquid contact elements, or the third vertical side 912 can include packing-type vapor-liquid contact elements. In another alternative, the first, second, and third vertical sides can have different packing-type vapor-liquid contact elements, can have different tray-type vapor-liquid contact elements, or can have different combinations thereof.

As such, a multicomponent stream 952 can be separated into four different components. A lighter component A can be drawn in the liquid stream 934, a heavier component D can be drawn from the liquid stream 940, and intermediate components B and C can be drawn from the side 912. For example, the lower boiling intermediate component B can be drawn at a higher vertical location within the side 912 in effluent stream 936, and a higher boiling intermediate component C can be drawn at a lower end of the side 912 in effluent stream 938.

EXAMPLES

Figure 8:
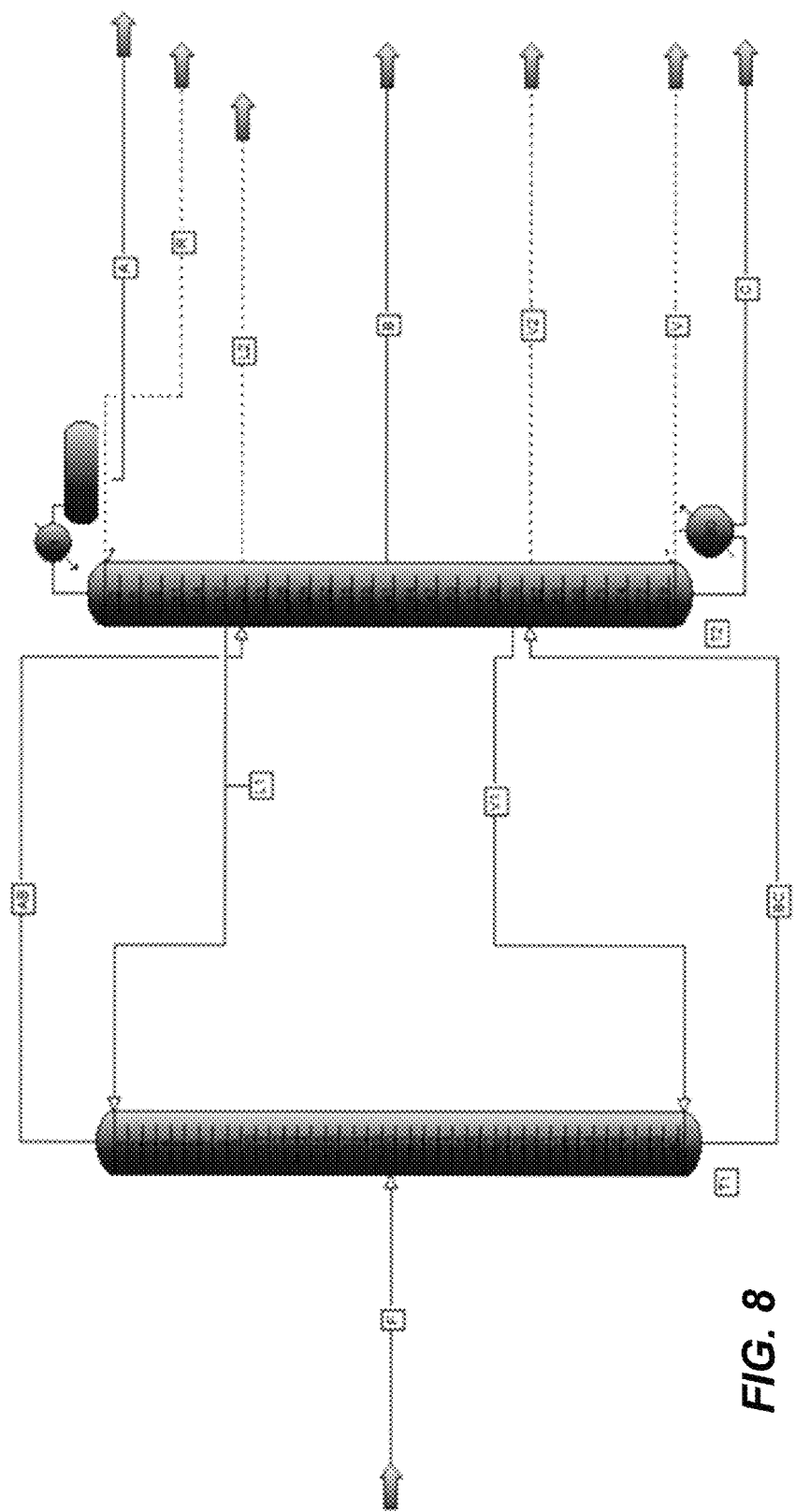
FIG. 8 includes a process flow diagram for an example simulation.

Process simulation cases are run using Simsci PRO/II. The basic configuration of the simulation is as illustrated in FIG. 8, which can be used to simulate both a Petlyuk arrangement and a divided wall column. An excess number of stages is selected such that stage count is not limiting and is close to minimum reflux. Three relatively high purity targets are selected. Components are referred to as A (top product), B (Mid boiler), and C (Bottom Product).

When designing a divided wall column, a specific set of feed and outlet purities are targeted. The tower internals and the location of the divide are set by the targeted purities, and the internals are designed to produce the specific flow through either column of a Petlyuk arrangement or of a divided wall column Table 1 below summarizes the energy and purities of an equimolar Methanol/Ethanol/Propanol mixture using a Petlyuk/Divided Wall arrangement.

The streams are designated as follows:
T1: Prefractionation side
T2: Product side and Top and Bottom Fractionation sections
F: Feed
R: Reflux
A: Top Product
B: Middle Product
AB: Prefractionator Vapor overhead to Top of T2
BC: Prefractionator Bottoms to Bottom of T2
L1: Liquid Feed to Prefractionator
L2: Liquid Feed to Product Side
V1: Feed from bottom section of T2 to Prefractionator
V2: Feed from bottom section of T2 to Product Side
V: total Boil Up from Reboiler
C: Bottom Product

TABLE 1

Baseline optimized Petlyuk/Divided Wall arrangement

| | | F | AB | L1 | L2 | V1 | V2 | BC | A | B | C | V | R |
|---|---|---|---|---|---|---|---|---|---|---|---|---|---|
| | | | | | | | Stream Name / Phase | | | | | | |
| | | Liquid | Vapor | Liquid | Liquid | Vapor | Vapor | Liquid | Liquid | Liquid | Liquid | Vapor | Liquid |
| Temperature | C. | 89.82 | 80.02 | 80.09 | 80.09 | 97.67 | 97.67 | 97.82 | 68.67 | 88.69 | 114.33 | 114.33 | 68.67 |
| Pressure | KG/CM2 | 1.60 | 1.38 | 1.38 | 1.38 | 1.74 | 1.74 | 1.74 | 1.20 | 1.56 | 1.92 | 1.92 | 1.20 |
| Enthalpy | M*KCAL/HR | 0.00 | 0.01 | 0.00 | 0.00 | 0.01 | 0.01 | 0.00 | 0.00 | 0.00 | 0.00 | 0.02 | 0.00 |
| Molecular Weight | | 46.07 | 38.73 | 40.55 | 40.55 | 48.81 | 48.81 | 51.04 | 32.38 | 45.72 | 60.04 | 59.99 | 32.38 |
| Mole Fraction Vapor | | 0.00 | 1.00 | 0.00 | 0.00 | 1.00 | 1.00 | 0.00 | 0.00 | 0.00 | 0.00 | 1.00 | 0.00 |

TABLE 1-continued

Baseline optimized Petlyuk/Divided Wall arrangement

| | | \multicolumn{12}{c}{Stream Name} |
|---|---|---|---|---|---|---|---|---|---|---|---|---|---|
| | | F | AB | L1 | L2 | V1 | V2 | BC | A | B | C | V | R |
| | | | | | | | Phase | | | | | | |
| | | Liquid | Vapor | Liquid | Liquid | Vapor | Vapor | Liquid | Liquid | Liquid | Liquid | Vapor | Liquid |
| Mole Fraction Liquid | | 1.00 | 0.00 | 1.00 | 1.00 | 0.00 | 0.00 | 1.00 | 1.00 | 1.00 | 1.00 | 0.00 | 1.00 |
| Rate | K-KG-MOL/HR | 1.00 | 0.99 | 0.49 | 0.80 | 0.95 | 0.59 | 1.45 | 0.33 | 0.33 | 0.33 | 1.55 | 1.37 |
| Fluid Rates | K-KG-MOL/HR | | | | | | | | | | | | |
| METHALC | | 0.33 | 0.52 | 0.19 | 0.31 | 0.02 | 0.01 | 0.02 | 0.32 | 0.01 | 0.00 | 0.00 | 1.34 |
| EA | | 0.33 | 0.47 | 0.29 | 0.48 | 0.73 | 0.46 | 0.89 | 0.01 | 0.32 | 0.00 | 0.01 | 0.03 |
| PRPLALC | | 0.33 | 0.00 | 0.00 | 0.00 | 0.20 | 0.13 | 0.54 | 0.00 | 0.00 | 0.33 | 1.54 | 0.00 |
| Total Molar Comp. Percents | | | | | | | | | | | | | |
| METHALC | | 33.33 | 52.41 | 39.46 | 39.46 | 1.82 | 1.82 | 1.61 | 97.60 | 2.59 | 0.00 | 0.00 | 97.60 |
| EA | | 33.33 | 47.49 | 60.45 | 60.45 | 76.83 | 76.83 | 61.34 | 2.40 | 97.30 | 0.40 | 0.75 | 2.40 |
| PRPLALC | | 33.33 | 0.10 | 0.09 | 0.09 | 21.35 | 21.35 | 37.05 | 0.00 | 0.11 | 99.60 | 99.25 | 0.00 |

Stream V represents the total boilup and can be correlated to the total energy consumption. (A higher V/F represents higher energy consumption).

TABLE 2

| \multicolumn{3}{c}{Energy Balance} |
|---|---|---|
| Column Name | | T2 |
| Column Description | | Product |
| Condenser Duty | M * KCAL/HR | −14.30 |
| Reboiler Duty | M * KCAL/HR | 14.50 |
| V/F | | 1.55 |

T1 diameter = 2200 mm
T2 diameter = 1750 mm

In the case of a divided wall column, the design includes one column of 2850 mm I.D. with the divide offset at 250 mm from the centerline of the tower. The calculated pressure drop across prefractionation side and product side of divided wall is 223.2 mmHG.

In the case of the divided wall tray column without vapor control, the hydraulic design across each side of the divide is such that the vapor split is predictable and equal to the design vapor split. Any deviation in calculated pressure drops from actual means that the vapor split is not as per design and efficiency is reduced. A best practices design for a tray tower is one in which the dry tray and wet tray pressure drops are designed as close as possible for each side the divide, so that at turn down or turn up conditions the balance of vapor is as close as possible. In the case of a standard Petlyuk configuration, the pressure drop across the transfer piping between columns is also considered as it affects the balance of flow.

Example 1. Turndown Limitations of Conventional Design

As operating conditions move away from the design point, the froth heights and the balance of wet/dry tray drop change on either side of the divide, resulting in a non-optimized vapor split, regardless of the liquid split. When evaluating a 50% turndown condition, L1 and L2 split is the same as the design bases, but the V1 and V2 split ratio changes due to the physical limitations of the internals, meaning that there is a relative increase in V/F and higher energy costs.

At turndown ratios, the pressure drop balance is different by 10 mm Hg (assuming the same overall conditions) at 50% turndown conditions. Without vapor control, the pressure drop self-balances and thus the columns operate in a non-optimized V1/L1 and V2/L2.

TABLE 3

| \multicolumn{5}{c}{Comparison of Design with and without Active Vapor Control} |
|---|---|---|---|---|
| Case | Design | Turndown | Design | Turndown |
| Arrangement | Standard | Standard | Proposed Vapor Control | Proposed Vapor Control |
| V1/V2 | 1.60 | 1.30 | 1.60 | 1.60 |
| Purity | \multicolumn{4}{c}{Mole %} |
| A | 97.6 | 94.7 | 97.6 | 97.6 |
| B | 97.3 | 92.8 | 97.3 | 97.3 |
| C | 99.6 | 98.0 | 99.6 | 99.6 |

Without vapor control, purities are vastly different than the original design, making for lost yields or unsellable products. In such an example, higher reflux and boil up ratios are required (in the range of 10%) to make the purities and yields the same as the design point, resulting in more energy costs per kg-mol of product produced. With vapor control, the purities are maintained and the vapor ratio is approximately constant, providing quality product even during turndown conditions.

Example 2. Charge Composition Limitations of Conventional Designs—Alternative Feed Cases In addition to problems with the balance at turndown operation, alternative feed compositions cause limitations. With alternative compositions, the optimized split (minimum energy for a given set of product purities) changes. A summary of the V1/V2 between the base design case considered before and feed composition of A=25 mole %, B=25 mole % and C=50 mole % ("Alternative Feed") case is shown below.

TABLE 4

Design Cases

| Case | Base Design | Alternate Feed |
|---|---|---|
| V1/V2 | 1.60 | 1.40 |
| Purity | Mole % | |
| A | 97.6 | 97.6 |
| B | 97.3 | 97.3 |
| C | 99.6 | 99.6 |

If the Alternative Feed case is selected as the primary design case, in the example of a divided wall column the "balanced" location of the divide is shifted by approximately 5%-8%. However, this shift is only practical in the case that only the Alternative Feed is used. If both the Alternative Feed and Base Feed are to be used changing the location of the dividing wall or the diameter of the Petlyuk columns is not an option.

For a tower designed with the Base Feed conditions, when operating at the Alternative Feed conditions, the purities of A and B fail to meet specifications. Absent active vapor control, the purities are overdesigned for the Base Feed case such that the drop-in purity and recover for the Alternative Feed is maintained, which leads to increased energy costs, negating one of the advantages to the heat integrated arrangement. However, as illustrated, utilizing relative vapor control, the vapor ratio, the purities, and the energy efficiency are maintained.

TABLE 5

Product Purities with and without Vapor Control

| Case | Alternative Feed Optimized or with vapor control | Alternative Feed Without vapor Control |
|---|---|---|
| V1/V2 | 1.40 | 1.58-1.62 |
| Purity | Mole % | |
| A | 97.6 | 92.4 |
| B | 97.3 | 75.7 |
| C | 99.6 | 99.99 |

In both of the above examples, active vapor control, for example, using a controlled bypass in a divide wall column (FIG. 2) or using a separate column (FIG. 3), permits energy efficiencies and desirable product purities even during alternative conditions.

In a first aspect, a separation system includes a column including a stripping section proximal to a lower end of the column, a rectifying section proximal to an upper end of the column, and an intermediate section disposed between the stripping section and the rectifying section, the intermediate section including first and second vertical sides separated by a vertical wall, the column including a feed port to receive a material stream to be separated; a reboiler in fluid communication with the column, the reboiler to receive liquid from the stripping section and to provide vapor to the stripping section, the reboiler to provide a bottoms effluent stream; a condenser in fluid communication with the column, the condenser to receive vapor from the rectifying section and to provide liquid to the rectifying section, the condenser to provide a distillate effluent stream; and an active vapor control to control the relative vapor flow rate to the first and second sides.

In an example of the first aspect, the feed port is to provide the material stream to the first vertical side.

In another example of the first aspect and the above examples, the separation system further includes an effluent port to access an effluent material stream from the second vertical side.

In a further example of the first aspect and the above examples, the active vapor control includes a vapor restriction disposed at a lower end of the second vertical side; a vapor bypass line to receive vapor from a top of the stripping section and provide vapor to the lower end of the second vertical side above the vapor restriction; and a control valve disposed in line with the vapor bypass line. For example, the separation system further includes an analyzer to determine composition, the control valve to control vapor flow rate through the vapor bypass line based on input from the analyzer. In another example, the separation system further includes a temperature analyzer, the control valve to control vapor flow rate through the vapor bypass line based on input from the temperature analyzer. In an additional example, the separation system further includes a flow meter in line with the vapor bypass line, the control valve to control vapor flow rate through the vapor bypass line based on input from the flow meter.

In an additional example of the first aspect and the above examples, the separation system further includes a liquid distributor to receive liquid from a lower end of the rectifying section and to distribute liquid to the first and second vertical sides.

In another example of the first aspect and the above examples, the first vertical side includes vapor-liquid contactors that are different from vapor-liquid contactors of the second vertical side. For example, the first vertical side includes packing vapor-liquid contactors and the second vertical side includes tray vapor-liquid contactors. In another example, the first vertical side includes tray vapor-liquid contactors and the second vertical side includes packing vapor-liquid contactors.

In a further example of the first aspect and the above examples, the separation system further includes a pressure drop element disposed in the first vertical side. For example, the pressure drop element comprises a chimney type tray.

In a second aspect, a separation system includes a first column including a stripping section proximal to a lower end of the column, a rectifying section proximal to an upper end of the column, and an intermediate section disposed between the stripping section and the rectifying section; a reboiler in fluid communication with the column, the reboiler to receive liquid from the stripping section and to provide vapor to the stripping section, the reboiler to provide a bottoms effluent stream; a condenser in fluid communication with the column, the condenser to receive vapor from the rectifying section and to provide liquid to the rectifying section, the condenser to provide a distillate effluent stream; a second column fluidically coupled to the first column to receive vapor from the first column from between the stripping section and the intermediate section, to receive liquid from the first column from between the intermediate section and the rectifying section, to provide vapor to the first column between the intermediate section and the rectifying section, and to provide liquid to the first column between the intermediate section and the stripping section; and an active vapor control to control the relative vapor flow rate to the intermediate section of the first column and to the second sides.

In an example of the second aspect, the separation system further includes a feed port on the second column to receive a feed stream. For example, the separation system further includes an effluent port to access the intermediate section of the first column.

In another example of the second aspect and the above examples, the separation system further includes a feed port on the first column to receive a feed stream.

In a further example of the second aspect and the above examples, the separation system further includes an effluent port to access the second column.

In an additional example of the second aspect and the above examples, the active vapor control includes a control valve disposed in a vapor line extending from the first column between the stripping section and the intermediate section to the lower end of the second column.

In another example of the second aspect and the above examples, the separation system further includes an analyzer to determine composition, the control valve to control vapor flow rate through the vapor bypass line based on input from the analyzer.

In a further example of the second aspect and the above examples, the separation system further includes a temperature analyzer, the control valve to control vapor flow rate through the vapor bypass line based on input from the temperature analyzer.

In an additional example of the second aspect and the above examples, the separation system further includes a flow meter in line with the vapor line, the control valve to control vapor flow rate through the vapor line based on input from the flow meter.

In another example of the second aspect and the above examples, the separation system further includes a liquid distributor to receive liquid from a lower end of the rectifying section and to distribute liquid to the intermediate section of the first column and to the second column.

In a further example of the second aspect and the above examples, the intermediate section of the first column comprises vapor-liquid contactors that are different from vapor-liquid contactors of the second column.

In an additional example of the second aspect and the above examples, the intermediate section of the first column includes packing vapor-liquid contactors and the second column includes tray vapor-liquid contactors.

In another example of the second aspect and the above examples, the intermediate section of the first column includes tray vapor-liquid contactors and the second column includes packing vapor-liquid contactors.

In a further example of the second aspect and the above examples, the separation system further includes a pressure drop element disposed in the intermediate section of the first column. For example, the pressure drop element comprises a chimney type tray.

In a third aspect, a method of retrofitting a two-column system includes inserting a divided wall section at an upper end of a first column, a lower end of a second column, or a combination thereof; connecting one or more vapor lines from an upper end of the first column to a lower end of the second column in accordance with a configuration of the divided wall section; connecting one or more liquid lines from a lower end of the second column to the upper end of the first column in accordance with the configuration of the divided wall section; and installing active vapor control on at least one of the one or more vapor lines.

In an example of the third aspect, the method further includes disconnecting a condenser from the first column and a reboiler from the second column.

In another example of the third aspect and the above examples, the method further includes installing a liquid distribution system above the divided wall section.

In a further example of the third aspect and the above examples, the method further includes installing a feed line to feed a multi-component stream to a side of the divided wall section.

In an additional example of the third aspect and the above examples, the method further includes installing a product effluent line to a second side of the divided wall section.

In a fourth aspect, a separation system includes a column including a stripping section proximal to a lower end of the column, a rectifying section proximal to an upper end of the column, and an intermediate section disposed between the stripping section and the rectifying section, the intermediate section including first, second, and third vertical sides separated by vertical walls, the column including a feed port to receive a material stream to be separated; a reboiler in fluid communication with the column, the reboiler to receive liquid from the stripping section and to provide vapor to the stripping section, the reboiler to provide a bottoms effluent stream; a condenser in fluid communication with the column, the condenser to receive vapor from the rectifying section and to provide liquid to the rectifying section, the condenser to provide a distillate effluent stream; and an active vapor control to control the relative vapor flow rate to the first, second, and third sides.

In an example of the fourth aspect, the feed port is to provide the material stream to the first vertical side.

In another example of the fourth aspect and the above examples, the separation system further includes two effluent port to access effluent material streams from the third vertical side.

In a further example of the fourth aspect and the above examples, the active vapor control includes a vapor restriction disposed at a lower end of the third vertical side; a vapor bypass line to receive vapor from a top of the stripping section and provide vapor to the lower end of the third vertical side above the vapor restriction; and a control valve disposed in line with the vapor bypass line. For example, the separation system further includes an analyzer to determine composition, the control valve to control vapor flow rate through the vapor bypass line based on input from the analyzer. In another example, the separation system further includes a temperature analyzer, the control valve to control vapor flow rate through the vapor bypass line based on input from the temperature analyzer. In an additional example, the separation system further includes a flow meter in line with the vapor bypass line, the control valve to control vapor flow rate through the vapor bypass line based on input from the flow meter.

In an additional example of the fourth aspect and the above examples, the separation system further includes a liquid distributor to receive liquid from a lower end of the rectifying section and to distribute liquid to the first, second, and third vertical sides.

In another example of the fourth aspect and the above examples, the first vertical side comprises vapor-liquid contactors that are different from vapor-liquid contactors of the second vertical side. For example, the first vertical side includes packing vapor-liquid contactors and the second vertical side includes tray vapor-liquid contactors. In another example, the first vertical side includes tray vapor-liquid contactors and the second vertical side includes packing vapor-liquid contactors.

In a further example of the fourth aspect and the above examples, the separation system further includes a pressure drop element disposed in the first vertical side. For example, the pressure drop element comprises a chimney type tray.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A separation system comprising:
    a column including a stripping section proximal to a lower end of the column, a rectifying section proximal to an upper end of the column, and an intermediate section disposed between the stripping section and the rectifying section, the intermediate section including first and second vertical sides separated by a vertical wall, the column including a feed port to receive in the first vertical side a material stream to be separated and including an effluent stream from the second vertical side, the column including a bottoms effluent stream;
    a reboiler in fluid communication with the column, the reboiler configured to receive liquid from the stripping section and configured to provide vapor to the stripping section;
    a condenser in fluid communication with the column, the condenser configured to receive vapor from the rectifying section and configured to provide liquid to the rectifying section, the condenser configured to provide a distillate effluent stream;
    an active vapor control configured to control the relative vapor flow rate to the first and second sides, wherein the active vapor control includes:
        a vapor restriction disposed at a lower end of the second vertical side;
        a vapor bypass line configured to receive vapor from a top of the stripping section and configured to provide vapor to the lower end of the second vertical side above the vapor restriction; and
        a control valve disposed in line with the vapor bypass line; and
    a temperature analyzer, wherein the control valve is configured to control vapor flow rate through the vapor bypass line based on input from the temperature analyzer derived from a temperature measurement made in the second vertical side below the effluent stream.

2. The separation system of claim 1, wherein the feed port is configured to provide the material stream to the first vertical side.

3. The separation system of claim 1, further comprising an effluent port configured to access an effluent material stream from the second vertical side.

4. The separation system of claim 1, further comprising an analyzer configured to determine composition, wherein the control valve is configured to control vapor flow rate through the vapor bypass line based on input from the analyzer.

5. The separation system of claim 1, further comprising a flow meter in line with the vapor bypass line, wherein the control valve is configured to control vapor flow rate through the vapor bypass line based on input from the flow meter.

6. The separation system of claim 1, further comprising a liquid distributor configured to receive liquid from a lower end of the rectifying section and configured to distribute liquid to the first and second vertical sides.

7. The separation system of claim 1, wherein the first vertical side comprises vapor-liquid contactors that are different from vapor-liquid contactors of the second vertical side.

8. The separation system of claim 7, wherein the first vertical side includes packing vapor-liquid contactors and the second vertical side includes tray vapor-liquid contactors.

9. The separation system of claim 7, wherein the first vertical side includes tray vapor-liquid contactors and the second vertical side includes packing vapor-liquid contactors.

10. The separation system of claim 1, further comprising a pressure drop element disposed in the first vertical side.

11. The separation system of claim 10, wherein the pressure drop element comprises a chimney type tray.

* * * * *